United States Patent [19]

Gasch

[11] Patent Number: 5,547,430
[45] Date of Patent: Aug. 20, 1996

[54] DRIVE ASSEMBLY FOR A FOUR WHEEL DRIVE VEHICLE HAVING A FIRST AND SECOND VISCOUS COUPLING

[75] Inventor: Christian Gasch, Lohmar, Germany

[73] Assignee: GKN Vicsodrive GmbH, Lohmar, Germany

[21] Appl. No.: 213,187

[22] Filed: Mar. 15, 1994

[30] Foreign Application Priority Data

Mar. 16, 1993 [DE] Germany .......................... 43 08 268.8

[51] Int. Cl.$^6$ .................................................. F16H 48/26
[52] U.S. Cl. ............................................. 475/89; 475/221
[58] Field of Search ............................. 475/221, 84, 85, 475/89

[56] References Cited

U.S. PATENT DOCUMENTS 4,836,051  6/1989  Guimbretiere ........................... 475/85

FOREIGN PATENT DOCUMENTS 0247008  11/1987  European Pat. Off. ............... 475/221

Primary Examiner—Charles A. Marmor
Assistant Examiner—Sherry Estremsky
Attorney, Agent, or Firm—Dinnin & Dunn, P.C.

[57] ABSTRACT

A drive assembly for a four wheel drive vehicle has, in the region of the front axle, a distributor assembly 5 which includes the distributor differential 13 for distributing the driving torque between the front axle and rear axle and two viscous couplings 39, 51 for at least partially locking the two differentials 13, 15. The two viscous couplings 39, 51 are arranged side by side, but coaxially relative to the rotational axis X—X. They are accommodated in a separate housing 14c which is removably connected to the housing 14c accommodating the front axle differential. A compact assembly is provided which, furthermore, by means of plug-in connections 40, 52, 59, enables an easy connection and association with the distributor differential 13 and the front axle differential 15, so that in a simple way, merely by exchanging a small number of parts, for instance the plug-in shaft 36, it is possible to provide a four wheel drive in a modular design, with and without locking means for the differentials.

6 Claims, 2 Drawing Sheets

DRIVE ASSEMBLY FOR A FOUR WHEEL DRIVE VEHICLE HAVING A FIRST AND SECOND VISCOUS COUPLING

BACKGROUND OF THE INVENTION

The invention relates to a drive assembly for a four wheel drive vehicle, particularly to an assembly including both a distributor differential and an axle differential. The distributor differential is designed as a spur gear differential and distributes driving torque between the drive axle and a first viscous coupling, which is provided for at least partially eliminating the differential function of the distributor differential. The axle differential and a second associated viscous coupling are provided for at least partially eliminating the differential function of the distributor differential. Both differentials and first and second couplings are arranged in the region of one of the drive axles. The ring gear of the distributor differential is connected to the main drive of the motor vehicle. Also, the distributor differential planetary gear carrier is connected to the axle drive of the second drive axle and its sun gear is connected to the axle drive of the first drive axle. The first viscous coupling is arranged between the planetary gear carrier and the sun gear. The second viscous coupling is arranged between the differential gear carrier of the axle differential of the axle drive of the first drive axle and its output end directed towards a wheel of the first drive axle. The two viscous couplings are arranged coaxially relative to one another on one side adjoining the axle differential and coaxially relative to its output end in the form of a plug-in shaft. The viscous couplings each include inner plates and outer plates, an inner plate carrier and an outer plate carrier and an inner space defined between both by housing parts. The couplings are at least partially filled with a high viscosity medium, such as silicone oil.

In the case of four wheel drive motor vehicles it is known to associate the distributor differential for distributing the driving torque to the two drive axles with the propeller shaft. It is also known to associate the distributor differential with the front axle. However, this arrangement leads to space problems. As cost reductions are important in the case of mass produced motor vehicles, attempts are made to obtain as many vehicle variants as possible by using modular design solutions.

SUMMARY OF THE INVENTION

It is therefore an object of the invention to provide a drive assembly which occupies a small amount of space. The distributor differential can be accommodated in a drive axle which is based on a modular design solution. Furthermore, it should be easy to replace components.

In accordance with the invention, the two viscous couplings are arranged side by side. The inner plate carriers of both viscous couplings are non-rotatingly connected to one another and, by means of a plug-in connection, to the differential gear carrier of the axle differential of the first drive axle. The outer plate carrier of the first viscous coupling, by means of a plug-in connection, is connected to the driving dish, which includes a gearwheel of the angle drive for driving the second drive axle. The plug-in shaft passes through the inner plate carrier of both viscous couplings. On the one hand, the shaft is non-rotatingly connected to the associated output bevel gear of the axle differential of the first drive axle by a plug-in connection and, on the other hand, to the outer plate carrier of the second viscous coupling. The plug-in connections are arranged coaxially relative to one another.

This embodiment is advantageous in that it is of simple design. Furthermore, because the individual components are connected so as to be removable, they are easy to replace. Depending on the application, the vehicle may be used as a four wheel drive vehicle without any locking means for the intermediate axle differential and the axle differential. However, it is also possible to choose a solution where only one of the differentials, additionally, may be locked by means of a viscous coupling. This space-saving design is particularly advantageous if applied to the front axle because in the case of transverse engines, space conditions are extremely restricted.

In one embodiment of the invention, the first viscous coupling is arranged more closely to the axle differential of the first drive axle than the second viscous coupling.

A particularly advantageous and thus space-saving assembly of components is obtained if, towards the axle differential, the inner plate carrier of the second viscous coupling is extended by a projection with the help of which, by means of the plug-in connection, it non-rotatingly engages a correspondingly designed connecting bore of the differential gear carrier and, by means of teeth on the outer face of the projection of the inner plate carrier of the second viscous coupling, the inner plate carrier of the first viscous coupling is non-rotatingly accommodated by accordingly designed counter teeth.

The plug-in connection is preferably arranged between the plug-in shaft and the outer plate carrier of the second viscous coupling at the end of the plug-in shaft facing away from the plug-in connection of the plug-in shaft of the output bevel gear. In this way, assembly of the plug-in shaft is simplified.

The invention is further complemented in that the two viscous couplings and the plug-in shaft are accommodated in a joint housing which is removably connected to the housing for the axle differential.

To obtain a unit which is ready for installation, the outer plate carrier of the first viscous coupling includes a projection by means of which, towards the axle differential, it is rotatably supported in a bore of the housing and the plug-in shaft is rotatably supported in a bearing cover associated with the housing. In this way it is ensured that the housing together with the viscous couplings and the plug-in shaft may be replaced as one unit and connected to the drive in the axle differential.

The question of supporting the outer plate carrier of the first viscous coupling is solved in that the outer plate carrier is arranged on the projection of the inner plate carrier of the second viscous coupling so as to be freely rotatable.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawing wherein.

DETAILED DESCRIPTION OF THE DRAWINGS

Figure 1:
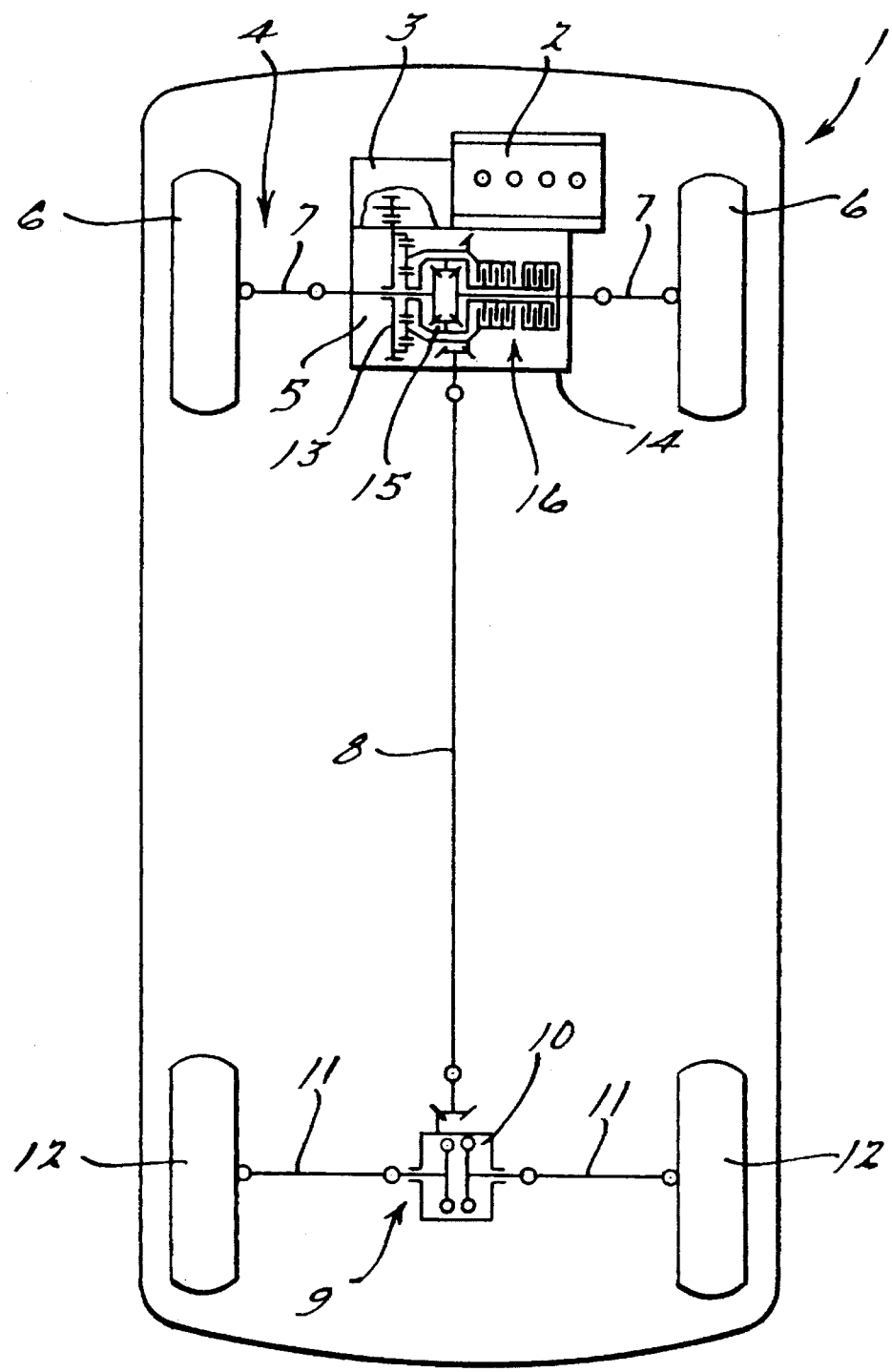
FIG. 1 is a schematic view of a motor vehicle incorporating the drive assembly in accordance with the invention.

In the case of the motor vehicle 1 shown in FIG. 1, the engine 2 and the gearbox 3 are arranged in the region of the front axle 4. The distributor assembly 5 serves to distribute the driving torque to the front wheels 6 and the rear wheels 12. The front wheels 6 are driven by the front axle differential 15 (not illustrated in detail) and by the sideshafts 7. The driving torque is transmitted to the rear wheels 12 of the rear axle 9 via the distributor assembly 5, the propeller shaft 8, the rear axle differential 10 and the sideshafts 11. The distributor assembly 5 includes the distributor differential 13, the front axle differential 15 and the viscous coupling assembly 16 accommodated in the housing 14 which is composed of a plurality of portions.

Figure 2:
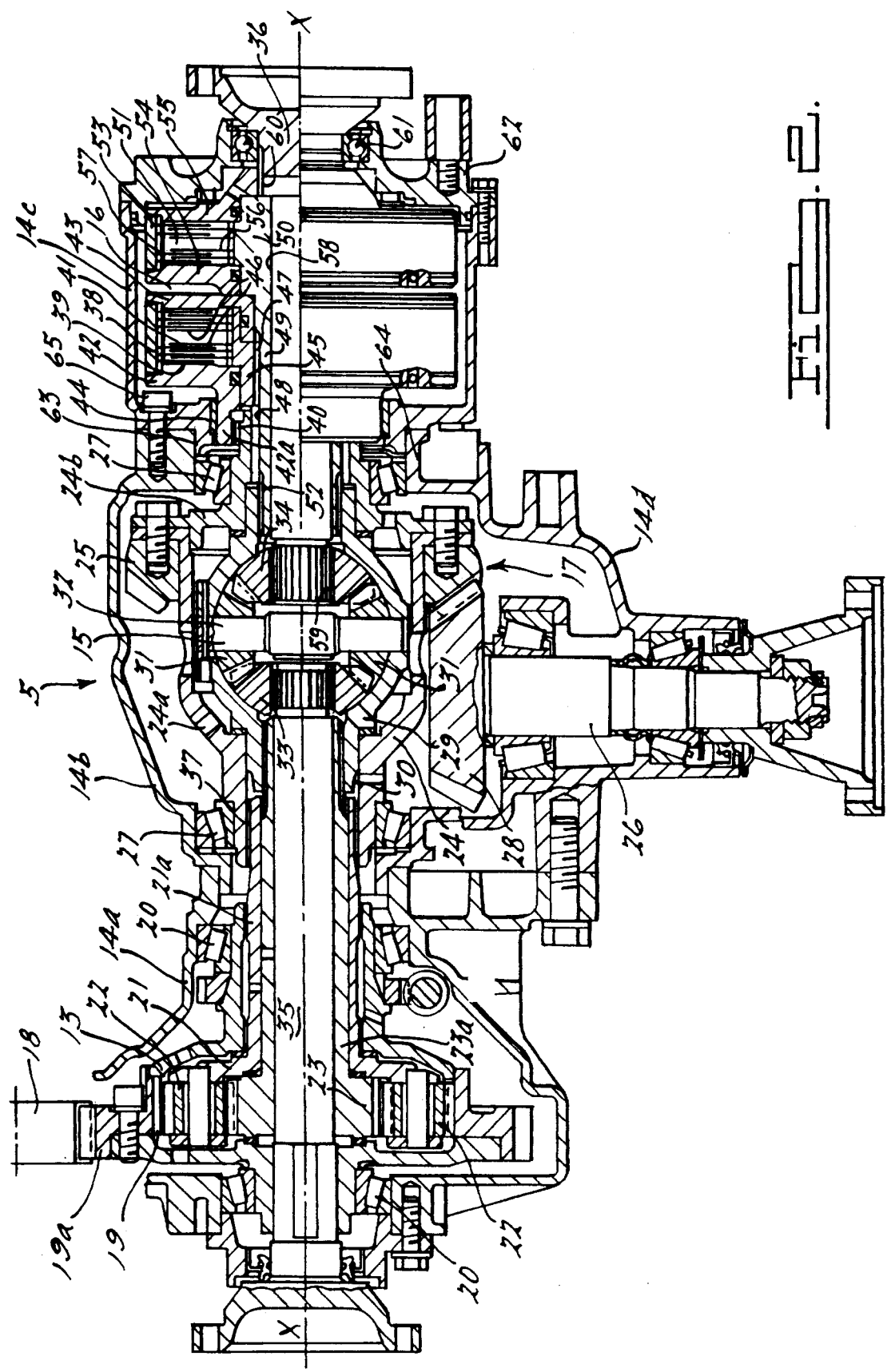
FIG. 2 is a longitudinal sectional view of a preferred embodiment of the distributor assembly.

Below, the distributor assembly 5 is explained in greater detail with reference to FIG. 2. The distributor assembly 5 arranged in the region of the front axle 4 including the first drive axle has a multi-part housing 14. The housing part 14a accommodates the distributor differential 13, the housing part 14b the front axle differential 15, the housing part 14c the viscous coupling assembly 16 and the housing part 14d the angle drive 17.

The distributor differential 13 is driven by the driving pinion 18 of the main drive 3. For this purpose, the distributor differential 13 includes a toothed outer ring 19a whose teeth engage the driving pinion 18. The outer ring 19a forms part of the ring gear 19 of the distributor differential 13 constituting the first member of the distributor differential 13. The ring gear 19 is designed to be divided and, on both sides, includes projections which are held in bearings 20. The bearings 20 serve to support the ring gear 19 in the housing part 14a. The projection of the ring gear 19 pointing towards the front axle differential 15 accommodates the planetary gear carrier 21. The planetary gears 22 are rotatably arranged on circumferentially distributed journals of the planetary gear carrier 21 and, by means of their teeth, engage the ring gear 19. The planetary gears 22, in turn, engage the central sun gear 23 which constitutes the third member of the distributor differential 13.

A hollow cylindrical projection 23a of the sun gear 23 extends coaxially through the projection 21a of the planetary gear carrier 21 in the direction of the front axle differential 15. The differential gear carrier 29 of the front axle differential 15 is non-rotatingly connected to the hollow cylindrical projection 23a of the sun gear 23 by means of teeth 30.

In the differential gear carrier 29 there is arranged a bearing pin 32 so as to extend at right angles relative to the rotational axis X—X. The bearing pin 32 rotatably holds the differential gears 31. The differential gears 31 engage the output bevel gears 33, 34 of which the output bevel gear 33 may be connected by means of a plug-in shaft 35 to the lefthand sideshaft of the front axle 4 for example. For this purpose, the plug-in shaft 35 projects from the housing 14 in the direction of the rotational axis X—X and, at its end, carries a flange suitable for connecting the sideshaft.

The differential gear carrier 29 is rotatably accommodated in a driving dish 24 which is divided and includes the two parts 24a and 24b which are non-rotatably connected to one another. The driving dish 24 is rotatably held in the two bearings 27 in the housing part 14b. The driving dish part 24a, by means of teeth 37, is non-rotatably connected to corresponding counter teeth provided at the hollow cylindrical projection 21a of the planetary gear carrier 21. Furthermore, the driving dish 24 is provided with a crown wheel 25 engaged by the teeth of a bevel gear 28 arranged at right angles relative thereto. The bevel gear 28 includes a journal 26 which projects from the housing part 14d and serves to provide a connection with the propeller shaft 8 shown in FIG. 1 and intended to pass on the driving torque to the wheels 12 of the rear axle 9. The bevel gear 28 and crown wheel 25 form the angle drive 17.

The outer plate carrier 38 of a first viscous coupling 39 is non-rotatably connected to the second part 24b of the driving dish 24 by means of inter-engaging teeth 40.

The outer plate carrier 38 includes two covers 42, 43 which extend radially inwardly and one of which comprises the teeth of the plug-in connection 40. On its inner face, the outer plate carrier 38 includes teeth which non-rotatably accommodate the outer plates 41 by means of corresponding counter teeth provided at the outer circumference thereof.

The inner plate carrier 45 is axially guided between the two covers 42, 43. Via its outer face, the inner plate carrier 45 is guided in a bore of the cover 42 and by means of a bore it is guided on a projection of the cover 43. The diameter of the outer face of the inner plate carrier 45 by means of which it is guided in the bore of the cover 42 and the diameter of the bore by means of which the inner plate carrier is guided on the projection of the second cover 43 are of equal size. Seals are arranged between the inner plate carrier 45 and the two covers 42, 43 of the outer plate carrier 38. The inner plate carrier 45 is also provided with teeth which non-rotatably accommodate the inner plates 46. The inner plates 46 are arranged so as to alternate with the outer plates 41 in a certain overlapping sequence. The inner space formed between the outer plate carrier 38 and the inner plate carrier 45 and not occupied by inner plates 46 and outer plates 41 is at least partially filled with a high-viscosity medium, for example silicone oil, so that a certain reaction moment builds up when the outer plate carrier 38 and the inner plate carrier 45 move relative to one another. The inner plate carrier 45 of the first viscous coupling 39 is non-rotatably connected by means of teeth in its bore to corresponding teeth 47 on the outer face 48 of a projection 49 of the inner plate carrier 50 of the second viscous coupling 51. The outer plate carrier 38 of the first viscous coupling 39 is supported in the housing 14c by means of a bearing 44.

The projection 49 of the inner plate carrier 50 of the second viscous coupling 51, by means of a plug-in connection 52 in the form of teeth, is non-rotatably but removably connected to the differential gear carrier 29 of the front axle differential 15. The outer plate carrier 53 of the second viscous coupling is rotatably supported on projections of the inner plate carrier 50 of the second viscous coupling 51. For this purpose, the outer plate carrier 53 includes two radially inwardly directed covers 54, 55 which, by means of bores thereof, are positioned on the projections and guiding faces of the inner plate carrier 50. Inner plates 56 are non-rotatably associated with the inner plate carrier 50. The outer plate carrier 53 of the second viscous coupling non-rotatably accommodates the outer plates 57. The inner space of the second viscous coupling 51 formed between the outer plate carrier 53 and the inner plate carrier 50 and not occupied by the overlapping inner plates 56 and outer plates 57 alternating in a certain sequence is also at least partially filled with a high viscosity medium, silicone oil for example, and a relative movement between the outer plate carrier 53 and the inner plate carrier 50 causes the viscous medium to be sheared, which results in a build-up of a reaction moment.

The plug-in shaft 36 is accommodated in a bore 58 of the inner plate carrier 50 and its projection 49. One of its ends extends into the output bevel gear 34 and is non-rotatably connected thereto by means of the plug-in connection 59. At its end projecting from the housing 14c, the plug-in shaft 36 is provided with a flange which serves to be connected to a corresponding flange of a sideshaft 7 of the motor vehicle leading to the righthand front wheel, as illustrated in FIG. 1. The plug-in shaft 36 includes a further plug-in connection 60 for connecting the outer plate carrier 53 of the second viscous coupling 51. Again, the teeth extend parallel to the rotational axis X—X as in the case of the remaining plug-in connections 40, 49, 52, 59.

By means of a bearing 61, the plug-in shaft 36 is supported in a housing cover 62 associated with the housing 14c. The housing 14c accommodates the two viscous couplings 39, 51 arranged side by side. Both viscous couplings 39, 51 are arranged coaxially relative to the rotational axis X—X. The housing 14c is centered at the housing part 14b by means of a centering projection 63 engaging a corresponding bore 64 in the housing part 14b and removably connected thereto by means of bolts 65.

By associating the viscous couplings in the form of a separate unit with the housing 14c and by providing them with plug-in connections it is possible, optionally, to provide the vehicle with a permanent four wheel drive without locking means for the distributor differential 13 and front axle differential 15 or to provide it with locking means, and the assembly may be such that the housing 14c includes only one viscous coupling, for example the first viscous coupling, for at least partially eliminating the differential function of the distributor differential 13 operating between the two drive axles, or it also includes the second viscous coupling 51 for at least partially eliminating the differential function of the front axle differential 15.

While the above detailed description describes the preferred embodiment of the present invention, the invention is susceptible to modification, variation, and alteration without deviating from the scope and fair meaning of the subjoined claims.

I claim:

1. A drive assembly for a four wheel drive vehicle, comprising;

a distributor differential having a ring gear, a planetary gear carrier and a sun gear, said distributor differential including a spur gear differential distributing driving torque between a first and second drive axle;

a first viscous coupling, said viscous coupling at least partially eliminating the differential function of said distributor differential;

an axle differential;

and a second viscous coupling, said second viscous coupling at least partially eliminating the axle differential function, both said differentials and said first and second viscous couplings are arranged in the region of one of said drive axles;

said ring gear of the distributor differential is connected to a main drive of a motor vehicle, said planetary gear carrier of said distributor differential is connected to an axle drive of the second drive axle and said sun gear is connected to an axle drive of the first drive axle, said first viscous coupling being arranged between a differential gear carrier of the axle differential of the axle drive of the first drive axle and an output end of said axle differential of said first drive axle directed towards a wheel of the first drive axle, said two viscous couplings being arranged coaxially relative to one another on one side of the axle differential and coaxially relative to said output end of said axle differential of said first drive axle, which includes a plug-in shaft, said viscous coupling each including inner plates and outer plates, an inner plate carrier and an outer plate carrier and an inner space defined between both by housing parts and being at least partially filled with a high viscosity medium;

said two viscous couplings are arranged side by side, said inner plate carriers of both viscous couplings are non-rotatingly connected to one another and, by means of a plug-in connection, to the differential gear carrier of the axle differential of the first drive axle, said outer plate carrier of the first viscous coupling, by means of a plug-in connection, is connected to a driving dish, said driving dish including a gearwheel of an angle drive for driving the second drive axle, a plug-in shaft passes through the inner plate carrier of both viscous couplings and is non-rotatingly connected to an associated output bevel gear of the axle differential of the first drive axle by means of a plug-in connection and to an outer plate carrier of the second viscous coupling, and said plug-in connections are arranged coaxially relative to one another;

wherein towards the axle differential, the inner plate carrier of the second viscous coupling is extended by a projection with the help of which, by means of a plug-in connection, it non-rotatingly engages a correspondingly designed connecting both of the differential gear carrier of the axle differential and by means of teeth on the outer face of the projection of the inner plate carrier of the second viscous coupling, the inner plate carrier of the first viscous coupling is non-rotatingly accommodated by counter teeth.

2. A drive assembly according to claim 1, wherein the first viscous coupling is arranged more closely to the axle differential of the first drive axle than the second viscous coupling.

3. A drive assembly according to claim 1, wherein a plug-in connection is arranged between the plug-in shaft and the outer plate carrier of the second viscous coupling at the end of the plug-in shaft facing away from the plug-in connection of the plug-in shaft in the output bevel gear.

4. A drive assembly according to claim 1, wherein the two viscous couplings and the plug-in shaft are accommodated in a joint housing which is removably connected to a housing for the axle differential.

5. A drive assembly according to claim 4, wherein the outer plate carrier of the first viscous coupling includes a projection by means of which, towards the axle differential, it is rotatably supported in a bore of the housing for said viscous couplings and that the plug-in shaft is rotatably supported in a bearing cover associated with the housing for said viscous couplings.

6. A drive assembly according to claim 3, wherein the outer plate carrier of the first viscous coupling is arranged on a projection of the inner plate carrier of the second viscous coupling so as to be able to rotate freely.

* * * * *

UNITED STATES PATENT AND TRADEMARK OFFICE
CERTIFICATE OF CORRECTION

PATENT NO. : 5,547,430
DATED : August 20, 1996
INVENTOR(S) : Christian Gasch

It is certified that error appears in the above-indentified patent and that said Letters Patent is hereby corrected as shown below:

Col 5, line 21, claim 1, after "between" insert --the planetary gear carrier and the sun gear, and said second viscous coupling being arranged between--.
Column 6, Line 55, Claim 1, delete "both" insert --- bore ---.

Signed and Sealed this

Tenth Day of June, 1997

BRUCE LEHMAN

Attest:

Attesting Officer

Commissioner of Patents and Trademarks